(12) United States Patent
Freudelsperger (10) Patent No.: US 7,441,387 B2
(45) Date of Patent: Oct. 28, 2008

(54) METHOD AND SYSTEM FOR COMMISSIONING ARTICLES WHICH ARE SUITABLE FOR A CENTRAL BELT AND ARTICLES WHICH ARE NOT SUITABLE FOR A CENTRAL BELT

(75) Inventor: Karl Freudelsperger, Hart bei Graz (AT)

(73) Assignee: Knapp Logistik Automation GmbH, Hart bei Graz (AT)

( * ) Notice: Subject to any disclaimer, the term of this patent is extended or adjusted under 35 U.S.C. 154(b) by 419 days.

(21) Appl. No.: 10/518,314

(22) PCT Filed: Jul. 18, 2003

(86) PCT No.: PCT/EP03/07899

§ 371 (c)(1),
(2), (4) Date: Dec. 16, 2004

(87) PCT Pub. No.: WO2004/014766

PCT Pub. Date: Feb. 19, 2004

(65) Prior Publication Data

US 2006/0177290 A1 Aug. 10, 2006

(30) Foreign Application Priority Data

Aug. 6, 2002 (DE) ................................ 102 35 900

(51) Int. Cl.
*A61J 7/00* (2006.01)

(52) U.S. Cl. ........................................ 53/168; 198/348

(58) Field of Classification Search ................. 414/268, 414/269, 270; 53/154–155, 237–238, 168
See application file for complete search history.

(56) References Cited

U.S. PATENT DOCUMENTS 5,271,703 A * 12/1993 Lindqvist et al. ............ 414/268

(Continued)

FOREIGN PATENT DOCUMENTS

EP 0 471 150 2/1992

(Continued)

*Primary Examiner*—Saul J. Rodriguez
*Assistant Examiner*—Charles Greenhut
(74) *Attorney, Agent, or Firm*—McGlew & Tuttle, P.C.

(57) ABSTRACT

A method and a commissioning system are provided for commissioning articles (A1) which are suitable for a central belt in a central belt commissioning system and articles (A2) which are not suitable for a central belt, preferably manually from an article warehouse or shelf (5), wherein articles which are suitable for a central belt (1) are commissioned and automatically fall directly onto the driven central belt (1) in a targeted manner, and at the end of the central belt they fall into a stationary container or immediately into a container (10) arranged on the driven central belt. The articles (A2) which are not suitable for a central belt are commissioned manually in containers (10) in a commissioning path to the right and/or left of the central belt (1) of the central belt commissioning device and are directly fed to a dispatching station or preferably to the central belt commissioning device for commissioning with articles (A1) which are suitable for a central belt.

18 Claims, 4 Drawing Sheets

U.S. PATENT DOCUMENTS

| | | | |
|---|---|---|---|
| 5,768,139 A * | 6/1998 | Pippin et al. | 700/216 |
| 5,832,693 A * | 11/1998 | Yuyama et al. | 53/168 |
| 5,943,841 A * | 8/1999 | Wunscher | 53/154 |
| 6,064,921 A * | 5/2000 | Pippin et al. | 700/242 |
| 6,289,260 B1 * | 9/2001 | Bradley et al. | 700/216 |
| 6,377,867 B1 * | 4/2002 | Bradley et al. | 700/216 |
| 6,505,093 B1 * | 1/2003 | Thatcher et al. | 700/216 |

FOREIGN PATENT DOCUMENTS

| | | |
|---|---|---|
| EP | 1 151 942 | 11/2001 |
| WO | WO 97/03903 | 2/1997 |

* cited by examiner

METHOD AND SYSTEM FOR COMMISSIONING ARTICLES WHICH ARE SUITABLE FOR A CENTRAL BELT AND ARTICLES WHICH ARE NOT SUITABLE FOR A CENTRAL BELT

CROSS REFERENCE TO RELATED APPLICATIONS

This application is a United States National Phase application of International Application PCT/EP2003/007899 filed Jul. 18, 2000 and claims the benefit of priority under 35 U.S.C. § 119 of German Application DE 102 35 900.8 filed Aug. 6, 2002, the entire contents of which are incorporated herein by reference.

FIELD OF THE INVENTION

The present invention pertains to a method and a commissioning system for commissioning articles which are suitable for a central belt in a central belt commissioning device and articles which are not suitable for a central belt manually from an article warehouse or shelf, in which articles which are suitable for a central belt are commissioned mostly manually from a commissioning unit into feed trays via a central belt and they then fall automatically from the feed trays in a targeted manner directly onto the driven central belt and from there into a stationary container or immediately into a container arranged on the driven central belt at the end of the central belt.

BACKGROUND OF THE INVENTION

Prior-art central commissioning devices, e.g., the so-called automatic A-frame unit, as well as semi-manual commissioning systems, in which articles are first distributed onto a central belt and subsequently into a container, have, in general, the drawback that only articles that can withstand this handling without being damaged can be commissioned.

Articles that are too large, too heavy or too fragile for such a handling must first be placed, as before, either onto a belt or pushed out automatically in a so-called "pick-to-belt system," by which said belt they are brought to a packing station or are packed in a shipping container or cardboard box in a machine built especially for this purpose, or the articles are placed directly from a commissioning shelf into a shipping container or cardboard box or are packed by a machine built especially for this purpose.

It may happen in modern commissioning warehouses that commissioning is to be performed in a mix of articles, which is composed of both articles which are suitable for a central belt, i.e., are relatively lightweight and robust, and articles which are not suitable for a central belt, i.e., are relatively large, heavy or fragile. Such article compositions can be found, for example, in drug stores, the food industry and in the electronics wholesale business.

The procedure followed hitherto in such cases is to separate this mix of articles into articles which are suitable for a central belt, which can be fed to a central commissioning device, in order to utilize the advantages of such a device in commissioning, and articles which are not suitable for a central belt, which continue to be packed into shipping containers or cardboard boxes manually or by means of a machine built especially for this purpose. Such a separation is performed, in principle, such that warehouse sites that are different in space, which also differ in terms of their commissioning means, are either connected with one another over relatively long paths by means of materials handling technology or are handled in a separated manner. It is disadvantageous that a plurality of warehouse areas must be distinguished, and a corresponding dividing of the articles must be carried out. Furthermore, there is the drawback that in the case of commissions that require articles from both areas, namely, articles which are suitable for a central belt and articles which are not suitable for a central belt, it is either necessary to travel over a long path, as a result of which the transit times of the commissions become longer, or it is necessary to provide two different containers for one commission.

SUMMARY OF THE INVENTION

The object of the present invention is to provide a method as well as a commissioning system for commissioning both articles which are suitable for a central belt and articles which are not suitable for a central belt, which is characterized by its simplicity and efficiency.

Based on the commissioning described in the introduction, the method according to the present invention is characterized in that the articles which are not suitable for a central belt are preferably commissioned by the same commissioning unit manually in containers or in a commissioning path directly to the right and/or left of the central belt of the central commissioning device and are fed directly to a dispatching station or preferably to the central belt commissioning device for commissioning with articles which are suitable for a central belt, and, in particular, the containers are filled manually with articles which are not suitable for a central belt on at least one conveying track in the commissioning area of the central belt in parallel to the central belt or in at least one discharge station of the conveying track, and that the containers filled with articles which are not suitable for a central belt are transferred either directly to the shipping station or for further filling with articles which are suitable for a central belt preferably by the same commissioning unit directly to the central belt or a removing path, which transfers the containers filled with articles which are not suitable for a central belt to the end of the central belt for further filling with articles which are suitable for a central belt.

Consequently, a conveying track is provided preferably in the form of a free roller path in the commissioning area of the central belt in parallel to the central belt in the mixed commissioning system according to the present invention for articles which are suitable for a central belt and articles which are not suitable for a central belt, and containers are arranged on the conveying path for manual filling with articles which are not suitable for a central belt, wherein the containers filled with articles which are not suitable for a central belt can be transferred either directly to the dispatching station or, for further filling with articles which are suitable for a central belt, directly to the driven central belt or a removing path, which delivers the containers filled with articles which are not suitable for a central belt to the end of the central belt for further filling with articles which are suitable for a central belt.

The central belt in the commissioning system according to the present invention is preferably located in a bay aisle of a double shelf, which has two parallel shelves located at spaced locations from one another, and with which a conveying track each, which is preferably close to the floor, is associated.

The conveying section may be integrated here in the shelf and be a structural component of the shelf at least partially.

However, the conveying track may also be arranged in the area of the central belt and be a structural component of the central belt system at least partially.

The removing path may be arranged above the central belt in parallel to the central belt or, as an alternative, directly next to the conveying track in a parallel arrangement, preferably at the same level as the conveying track.

The conveying track(s), removing path(s) and/or the central belt may be preferably provided with discharge stations.

Thus, the present invention pertains to a central belt commissioning device especially of the type described in the introduction, in which articles are preferably commissioned at first mostly manually in feed trays above a central belt and then fall automatically from the feed trays onto the central belt and from there they enter a container, or they fall immediately into a container arranged on the central belt, combined with conventional commissioning technology in the form of at least one conveying track, especially a free roller path, or a materials handling technology with commissioning stations and discharge stations in a number of variants.

The articles may remain in the same path either in the completely mixed form or divided at least only within the same commissioning path, which forms a system. As a result, the advantages of the central belt commissioning unit, namely, the higher commissioning output due to automation or due to the elimination of the handling of containers, can be utilized in the mixed commissioning system according to the present invention without having to accept the drawbacks of that system, namely, the lack of possibility of handling articles which are not suitable for a central belt.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

The present invention will be explained in greater detail below on the basis of exemplary embodiments with reference to the drawings attached; in the drawings.

DESCRIPTION OF THE PREFERRED EMBODIMENTS

Figure 1:
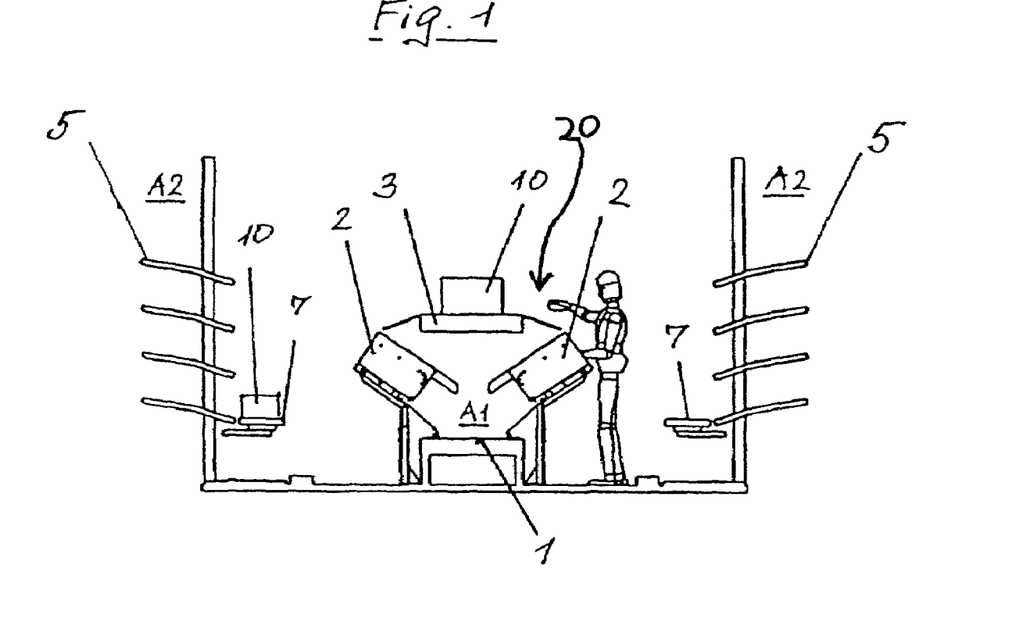
FIG. 1 is a schematic cross-sectional view of a first embodiment variant of a mixed commissioning system for articles which are suitable for a central belt and articles which are not suitable for a central belt within a commissioning path, with a central belt and two shelves arranged at spaced locations from one another.

According to FIG. 1, a first embodiment variant of a mixed commissioning system for commissioning articles A1 which are suitable for a central belt comprises a central belt commissioning device 20 with a central belt 1 which is directly associated with or is arranged in the vicinity of a commissioning system for commissioning articles A2 which are not suitable for a central belt with a double shelf comprising two parallel shelves 5, which are arranged at spaced locations from one another and form a bay aisle.

The central belt 1 of the central belt commissioning device is located in the bay aisle between the two shelves 5 centrally and in parallel, and, furthermore, two rows of feed trays 2 are provided above the central belt 1 slightly offset laterally to the right and left. A removing path 3, which leads at its outlet (not shown) or longitudinal end to the corresponding longitudinal end of the central belt 1, is located centrally above the central belt 1.

A horizontal conveying track 7 each in the form of a free roller path, on which containers 10 are located for the manual commissioning of articles A2 which are not suitable for a central belt, is integrated in the area of the lowermost planes of the shelves 5 on the aisle side between the shelves. The free roller path is designed as a so-called straight pushing track, which extends in parallel to the central belt 1, which is located adjacent but at a spaced location.

The arrangement is thus selected to be such that a commissioning path is formed for at least one commissioning unit each within the bay aisle both to the right and to the left of the central belt 1, and the commissioning unit is manually easily accessible to both the conveying track 7 facing it and the containers 10 of the conveying track and the feed tray 2 facing it and the central removing path 3.

Thus, the aforementioned first embodiment variant comprises a central belt commissioning device, e.g., of the type described in the introduction, with a central belt 1, feed trays 2 and an additional removing path 3 above the central belt 1, on which [said removing path] the containers 10, which were picked manually, are removed. Furthermore, the first embodiment variant comprises two manual pushing tracks in the form of two conveying tracks 7 in the shelves 5.

The commissioning operation takes place as follows.

Empty containers 10 or cardboard boxes are placed in advance on the free roller path or on the corresponding conveying track 7, usually in the station in which they are processed. The articles A2 which are not suitable for a central belt are then commissioned manually into the containers 10 or cardboard boxes, which are pushed further on the conveying tracks 7 in the shelf 5. The filled containers/cardboard boxes are then pushed or lifted by the corresponding commissioning unit over onto the central removing path 3 located above the central belt 1 and they reach from there the transfer point of the longitudinal end of the subjacent central belt 1.

The articles A1 which are suitable for a central belt are commissioned or filled preferably simultaneously at first into the feed trays 2 or into automatic channels, e.g., a high-speed automatic rotating unit. They are ejected from there automatically onto a defined point of the central belt 1 and filled at the end of the central belt 1 into the above-mentioned, prefilled containers 10 or cardboard boxes, in which the articles A2 which are not suitable for a central belt have already been commissioned. If a container/cardboard box is filled completely or the commissioning order is concluded, the containers/cardboard boxes are moved in the direction of the dispatching station after strapping, labeling, etc.

Thus, articles A1 which are suitable for a central belt and articles A2 which are not suitable for a central belt can be commissioned in the mixed commissioning system at any time and at any place.

The removing track 3 may optionally lead directly to the dispatching station, bypassing the transfer point or the outlet of the central belt 1. The articles which are not suitable for a central belt now reach the dispatching station directly unmixed. Corresponding statements can also be made for the articles which are suitable for a central belt.

Figure 2:
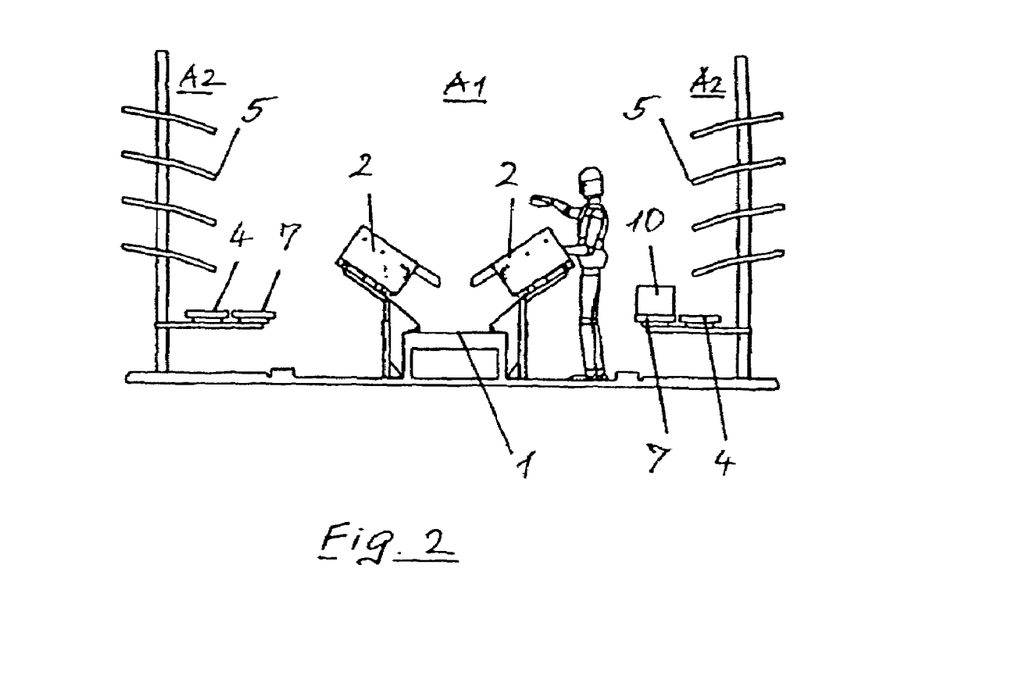
FIG. 2 is a second embodiment variant of the mixed commissioning system similar to FIG. 1.

The embodiment variant according to FIG. 2 corresponds essentially to the variant according to FIG. 1. However, the central removing track 3 is replaced above the central belt 1 by two independent removing tracks 4 or belts in the shelves 5 to the left and right of the commissioning path. The removing tracks 4 are located in the close proximity of and at the same level as the corresponding conveying track 7 and are likewise integrated in the corresponding shelf 5 in the lower shelf plane. The further conveying of the containers 10 can again take place either directly to the dispatching station or at the end of the system at first to the transfer site of the central belt 1, at which the articles A1 which are suitable for a central belt are transferred into the container 10, in which the articles A2 which are not suitable for a central belt are already commissioned.

The two conveying tracks 7 of the shelves 5 to the left and right of the central belt 1 may be designed not only as simple pushing tracks, but also as conventional commissioning stations with automatic discharge into same.

The second embodiment variant differs from the first embodiment variant in terms of the commissioning function only in that the lifting off of the containers 10 with the commissioned articles which are not suitable for a central belt from the conveying tracks 7 into the shelves 5 and the pushing over onto the central removing track 3 via the central belt within the middle of the path are eliminated. The containers 10 are pushed here over directly from the conveying tracks 7 onto the inner removing tracks 4 in the shelves 5.

If the removing tracks 4 are provided with discharge stations, it is possible in this variant to select the containers/cardboard boxes for the articles which are not suitable for a central belt in the shelf areas only by which articles are actually needed. As a result, the containers can, in turn, be placed centrally on the conveying track 7, because the commissioning is not interfered with by empty containers that do not need any articles from the corresponding shelf area.

Presorting of the articles for a certain container to a certain shelf area may likewise be eliminated or it does not need to be handled so strictly, even if such presorting still minimizes the path of the containers/cardboard boxes along the shelves or the approached commissioning stations and increases the commissioning output as a result.

Figure 3:
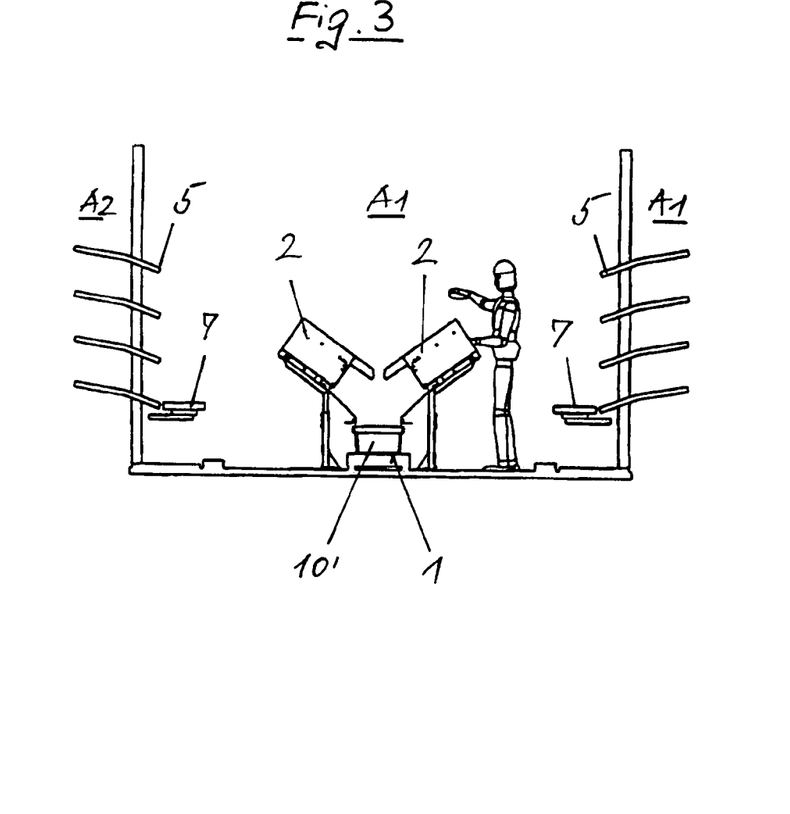
FIG. 3 is a third embodiment variant of the mixed commissioning system similar to FIGS. 1 and 2.

The third embodiment variant according to FIG. 3 corresponds essentially to the first embodiment variant according to FIG. 1, but without an additional removing belt or removing track 3. The containers 10 with the articles A2 which are not suitable for a central belt are removed on the central belt 1 of the central belt commissioning device. In this variant, the articles which are suitable for a central belt are not thrown directly onto the central belt 1 from the central belt commissioning device and transferred into the containers only at the end of the central belt, but they are transferred directly into containers 10', which are conveyed through the warehouse on the single central belt 1. Containers 10 with articles A2 which are not suitable for a central belt run mixed with containers 10 containing articles A1 which are suitable for a central belt.

Consequently, the embodiment variant according to FIG. 3 differs from that according to FIG. 1 in terms of the commissioning function in that the containers/cardboard boxes with the articles A2 which are not suitable for a central belt are placed, as soon as they are completely commissioned, directly on the central belt 1, on which the containers with the articles A1 containing the articles which are suitable for a central belt also run, rather than on a central removing track 3, which is absent here.

Figure 4:
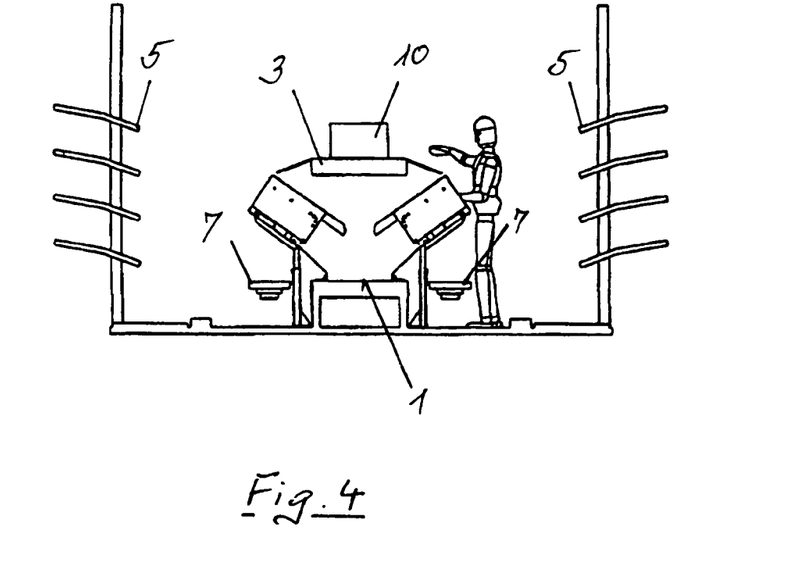
FIG. 4 is a fourth embodiment variant of the mixed commissioning system similar to FIGS. 1, 2 and 3.

The fourth embodiment variant according to FIG. 4 differs from the first embodiment variant according to FIG. 1 in that the additional pushing tracks or conveying tracks 7 are not integrated in the shelves 5, but already extend next to the central belt 1. Space can be saved as a result. The articles A2 which are not suitable for a central belt are commissioned in the containers/cardboard boxes directly to the right or left of the central belt 1. After commissioning, the containers 10 are pushed or lifted over onto the central removing track 3 above the central belt 1.

Figure 5:
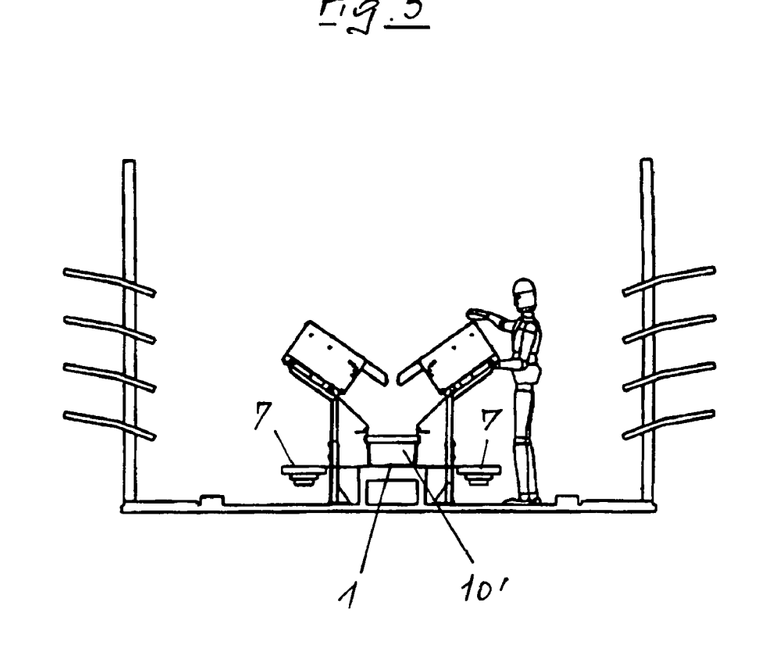
FIG. 5 is a fifth and sixth embodiment variant of the mixed commissioning system similar to FIGS. 1 through 4.

The fifth exemplary embodiment according to FIG. 5 corresponds essentially to that according to FIG. 4. The containers with the articles A2 which are not suitable for a central belt are, however, not pushed over onto the central removing track 3 above the central belt 1, but directly onto the central belt 1 similarly to FIG. 3.

Figure 6:
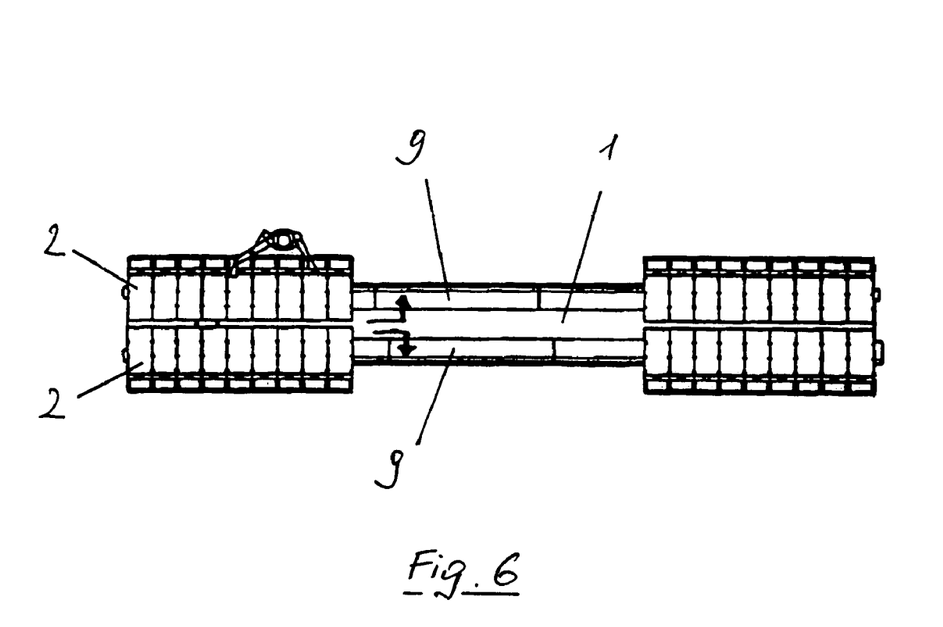
FIG. 6 is a schematic top view of the sixth embodiment variant of the mixed commissioning system according to FIG. 5.

The sixth embodiment variant corresponds essentially to the embodiment variant according to FIG. 5, but it additionally provides for discharge stations 9 at the only central belt 1, as this is apparent especially from the top view in FIG. 6, so that the pushing tracks become conventional manual commissioning stations. As a result, the containers/cardboard boxes do not have to be placed first on the system in the corresponding commissioning stations, but they can be charged in at a central loading point for the entire system or for a plurality of commissioning systems and discharged again at the corresponding commissioning stations. The amount of containers to be handled in the stations decreases as a result, as does the handling of the containers. The commissioning output is high.

Figure 7:
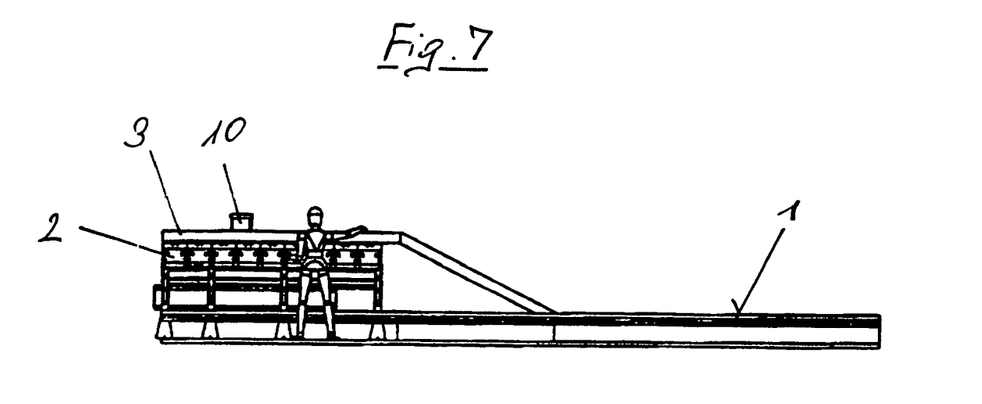
FIG. 7 is a schematic side view of a seventh embodiment variant of a mixed commissioning system.
Figure 8:
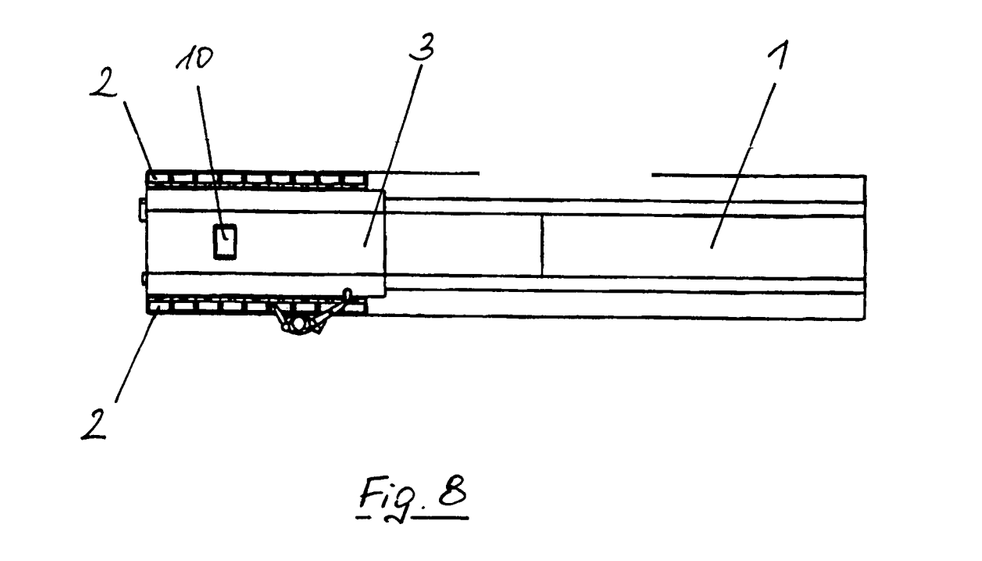
FIG. 8 is a schematic top view of the seventh embodiment variant of the commissioning system according to FIG. 7.

The seventh embodiment variant according to FIGS. 7 and 8 has a handling as is described, in principle, in the variants 1 through 6, but it is separated for articles A1 which are suitable for a central belt and articles A2 which are not suitable for a central belt, but nevertheless within the same commissioning path or system. The articles A2 which are not suitable for a central belt are advantageously concentrated in such a system at the beginning of the commissioning path when viewed in the direction of conveying, because articles A1 which are suitable for a central belt can then still be commissioned in the running flow by means of an automatic commissioning unit, without thus having to run over a longer path.

As an alternative, arrangement of the articles A2 which are not suitable for a central belt at the end of a commissioning path is possible in this embodiment variant. The articles A1 which are suitable for a central belt are now complemented ultimately mainly manually with articles A2 which are not suitable for a central belt. This has the advantage that the articles of the central belt commissioning device first fall into the empty container and as a result, they do not jump out of the container/cardboard box with a high probability.

Consequently, the articles which are suitable for a central belt are separated from the articles which are not suitable for a central belt within the commissioning path in the seventh embodiment variant. The central belt system as well as the conventional commissioning system with pushing tracks or commissioning stations or discharge stations can be made shorter here, namely, in the area in which the particular articles which are suitable for a central belt and the articles which are not suitable for a central belt are stored. Costs can thus be saved while the transit times are still short and the containers may be mixed if desired.

While specific embodiments of the invention have been shown and described in detail to illustrate the application of the principles of the invention, it will be understood that the invention may be embodied otherwise without departing from such principles.

The invention claimed is:

1. A method for commissioning articles, the method comprising the steps of:
    providing a double shelf unit including two parallel shelving units arranged at spaced locations from one another to define a bay aisle;
    providing a plurality of containers;
    positioning a central belt within said bay aisle such that one shelving unit is located on one side of said central belt and another shelving unit is located on another side of said central belt, said central belt being associated with a central belt commissioning device, said central belt commissioning device including a discharge station;
    providing conveying tracks, one conveying track being parallel to another conveying track, each conveying track defining a commissioning path, one conveying track being associated with one of said shelving units on one side of said central belt, another conveying track being associated with another of said shelving units on another side of said central belt, said containers being located on said conveying tracks;
    providing a plurality of first articles, each first article having a transportation property such that each first article can be transported via said central belt;
    providing a plurality of second articles, said second articles being located on one of said shelves, each second article having a transportation property such that each second article cannot be transported via said central belt;
    transferring said second articles from said shelves into said containers;
    automatically moving said first articles from a location above said central belt to a location on said central belt;
    transporting said containers with said second articles to said discharge station or to said central belt for commissioning with said first articles, wherein said first articles are placed in said containers with said second articles when said containers with said second articles are transferred to said central belt; and
    transferring said first articles from said central belt to a stationary container arranged at an end of said central belt when said containers with said second articles are transported to said discharge station.

2. A method in accordance with claim 1, further comprising the steps of:
    providing a removing track; and
    transferring said containers filled with said second articles via said removing track when said containers with said second articles are transferred to said end of said central belt via said removing track, wherein said first articles are placed into said containers filled with said second articles.

3. A method in accordance with claim 1, wherein said conveying tracks are parallel to said central belt.

4. A commissioning system for commissioning articles, the system comprising:
    a central belt associated with an article commissioning device discharging station;
    a first shelving unit located on one side of said central belt;
    a second shelving unit located on another side of said central belt at a spaced location from said first shelving unit to define a bay aisle, said first shelving unit being parallel to said second shelving unit, said central belt being located within said bay aisle such that said central belt extends parallel to said first shelving unit and said second shelving unit;
    a plurality of first articles, each first article having a transportation property such that each first article can be transported via said central belt;
    a plurality of second articles located on said first shelving unit and said second shelving unit, each second article having a transportation property such that each second article cannot be transported via said central belt;
    a means for automatically moving said plurality of first articles onto said central belt;
    a first container;
    a second container;
    a first conveying track in the form of a free roller path associated with said first shelving unit, said first container being arranged on said first conveying track, said first container receiving one or more said second articles from said first shelving unit;
    a second conveying track in the form of a free roller path associated with said second shelving unit, said second container being arranged on said second conveying track, said second container receiving one or more said second articles from said second shelving unit;
    a removing track, said containers filled with said second articles being transferred to said discharging station or to said central belt for further filling with said first articles or to said removing track such that said removing track conveys said containers filled with said second articles to the end of the central belt for further filling with said first articles.

5. A commissioning system in accordance with claim 4, wherein said first shelving unit has a first shelf and a second shelf, said first shelf being parallel to said second shelf, said first shelf being arranged at a spaced location from said second shelf, said second shelving unit having one shelf and another shelf, said one shelf being parallel to said another shelf, said one shelf being arranged at a spaced location from said another shelf, said first conveying track and said second conveying track being located close to the floor.

6. A commissioning system in accordance with claim 5, wherein the first conveying track is designed as a first conveying track integrated in the first shelf and is a structural component of the first shelf at least partially, said second conveying track being integrated in said another shelf, said second conveying track being a structural component of said another shelf at least partially.

7. A commissioning system in accordance with claim 5, wherein the conveying track is arranged in the area of the central belt and is a structural component of the central belt commissioning device at least partially, said second conveying track being arranged in said area of said central belt, said second conveying track being a structural component of said central belt commissioning device at least partially.

8. A commissioning system in accordance with claim 4, wherein said first conveying track is designed as a first conveying track integrated in said first shelf and is a structural component of the first shelf at least partially, said second conveying track being integrated in said another shelf, said second conveying track being a structural component of said another shelf at least partially.

9. A commissioning system in accordance with claim 4, wherein the first conveying track is arranged in the area of the central belt and is a structural component of the central belt commissioning device at least partially, said second conveying track being arranged in said area of said central belt, said second conveying track being a structural component of said central belt commissioning device at least partially.

10. A commissioning system in accordance with claim 4, wherein the removing track is arranged above the central belt.

11. A commissioning system in accordance with claim 4, wherein the removing track is provided directly next to the first conveying track and the second conveying track in a parallel arrangement, at the same level.

12. A commissioning system in accordance with claim 5, wherein the first conveying track, the second conveying track, the removing track or the central belt is provided with at least one said discharge station.

13. A commissioning system in accordance with claim 4, wherein said first conveying track and said second conveying track are parallel to said central belt.

14. A method for commissioning articles, the method comprising the steps of:
 providing a driven central belt associated with a central belt commissioning device, said central belt commissioning device including discharge station
 providing central belt articles which are movable along the central belt at a position above the central belt such that said central belt articles are able to fall directly onto the driven central belt;
 providing sensitive articles which are not movable along the central belt in an article shelving system, said shelving system comprising a first shelving unit located on one side of said central belt and a second shelving unit located on another side of said central belt, said first shelving unit and said second shelving unit defining an aisle, said central belt being located in said aisle;
 commissioning central belt articles in the central belt commissioning device from the central belt into a stationary container or into a container arranged at the end of the central belt;
 removing one or more said sensitive articles from at least one said shelving unit and placing one or more said sensitive articles in one or more containers in a commissioning path to the right and left of the central belt of the central belt commissioning device, said commissioning path being defined by a first conveying track associated with said first shelving unit and a second conveying track associated with said second shelving unit, said first conveying track and said second conveying track being located at a spaced location from said central belt, wherein a portion of said first conveying track and a portion of said second conveying track extends parallel to said central belt; and
 sending the sensitive articles in the containers directly to the discharging station or to the central belt commissioning device for commissioning with the central belt articles.

15. A method in accordance with claim 14, wherein said containers with sensitive articles are transferred either directly to the discharging station or for further filling with said central belt articles, directly to the central belt or to a removing track such that said removing track transfers the containers filled with said sensitive articles to the end of the central belt for further filling with said central belt articles.

16. A method in accordance with claim 14, wherein said first shelving unit is parallel to said second shelving unit.

17. A method in accordance with claim 14, wherein a portion of said first conveying track is parallel to a portion of said second conveying track.

18. A method in accordance with claim 14, wherein said first conveying track is located on one side of said central belt and said second conveying track is located on another side of said central belt.

* * * * *